United States Patent
Chae et al.

(10) Patent No.: US 10,630,352 B2
(45) Date of Patent: Apr. 21, 2020

(54) SIGNAL TRANSMISSION METHOD AND APPARATUS OF APPARATUS HAVING PLURALITY OF ANTENNAS IN WIRELESS COMMUNICATION SYSTEM

(71) Applicant: LG ELECTRONICS INC., Seoul (KR)

(72) Inventors: Hyukjin Chae, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/524,884

(22) PCT Filed: Nov. 9, 2015

(86) PCT No.: PCT/KR2015/012006
§ 371 (c)(1),
(2) Date: May 5, 2017

(87) PCT Pub. No.: WO2016/072819
PCT Pub. Date: May 12, 2016

(65) Prior Publication Data
US 2018/0248595 A1    Aug. 30, 2018

Related U.S. Application Data
(60) Provisional application No. 62/076,499, filed on Nov. 7, 2014.

(51) Int. Cl.
*H04B 7/0456* (2017.01)
*H04B 7/06* (2006.01)

(52) U.S. Cl.
CPC ......... *H04B 7/0456* (2013.01); *H04B 7/0473* (2013.01); *H04B 7/0613* (2013.01); *H04B 7/0671* (2013.01); *H04B 7/0482* (2013.01)

(58) Field of Classification Search
CPC ... H04B 1/38; H04B 7/02; H04B 7/04; H04B 7/06; H04B 7/08; H04B 7/024;
(Continued)

(56) References Cited

U.S. PATENT DOCUMENTS

2008/0192856 A1    8/2008  Jongren et al.
2008/0260070 A1*  10/2008  Ho ...................... H04L 27/2602
                                                           375/302
(Continued)

FOREIGN PATENT DOCUMENTS

CN          101611568 A         12/2009
CN          102036301 A          4/2011
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 10)," 3GPP TS 36.211, V10.1.0, Mar. 2011, pp. 1-104, XP050476528.
(Continued)

*Primary Examiner* — Shawkat M Ali
(74) *Attorney, Agent, or Firm* — Birch, Stewart, Kolasch & Birch, LLP

(57) ABSTRACT

A method for transmitting a signal by an apparatus having a plurality of antennas in a wireless communication system, according to one embodiment of the present invention, comprises the steps of: mapping complex modulation symbols to L layers; sequentially applying a unit matrix U, a diagonal matrix D, and a precoding matrix W to the symbols which have been mapped to the L layers; and mapping symbols which have been mapped to DMRS ports by applying W, D and U, wherein W is one of M sets of precoders, each of the M sets of precoders comprising a plurality of column vectors, and wherein if the number of
(Continued)

DMRS ports is smaller than M*L, the M sets of precoders include at least one identical column vector.

10 Claims, 7 Drawing Sheets

(58) Field of Classification Search
CPC .... H04B 7/208; H04B 7/0456; H04B 7/0613; H04L 5/00; H04L 5/14; H04L 5/0001; H04L 25/02; H04L 25/49; H04L 27/00; H04W 24/00; H04W 40/00; H04W 72/04; H04W 88/02
USPC ........ 370/328, 329, 344; 375/219, 260, 267, 375/295, 296, 299, 340
See application file for complete search history.

(56) References Cited

U.S. PATENT DOCUMENTS

| | | | |
|---|---|---|---|
| 2010/0034312 A1* | 2/2010 | Muharemovic | H04L 27/2613 375/267 |
| 2011/0134849 A1* | 6/2011 | Lee | H04B 7/0671 370/328 |
| 2011/0194593 A1* | 8/2011 | Geirhofer | H04W 72/048 375/224 |
| 2012/0213310 A1 | 8/2012 | Ko et al. | |
| 2013/0094468 A1 | 4/2013 | Ko et al. | |
| 2014/0029695 A1 | 1/2014 | Liu et al. | |
| 2014/0185699 A1 | 7/2014 | Zhang et al. | |

FOREIGN PATENT DOCUMENTS

| | | |
|---|---|---|
| CN | 102158319 A | 8/2011 |
| CN | 102957467 A | 3/2013 |
| CN | 103782560 A | 5/2014 |
| WO | WO 2013/033919 A1 | 3/2013 |
| WO | WO 2014/129858 A1 | 8/2014 |

OTHER PUBLICATIONS

Catt, "Definitions for Active Antenna Systems (AAS)," 3GPP TSG-RAN WG4 Meeting #69, R4-136495, San Francisco, USA, Nov. 11-15, 2013, pp. 1-4.

Samsung, "Need for Aggregated CQI Across CSI-RS Resources," 3GPP TSG RAN WG1 #69, R1-122230, Prague, Czech Republic, May 21-25, 2012, 4 pages.

* cited by examiner

FIG. 5
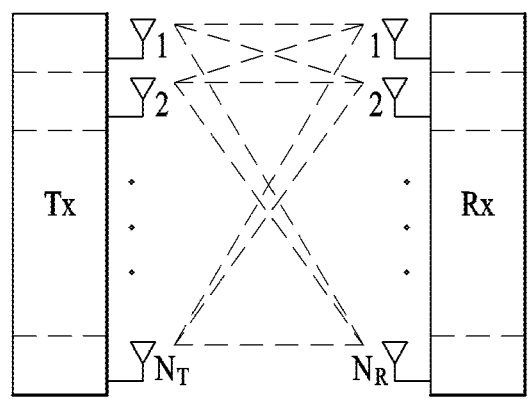
(a)
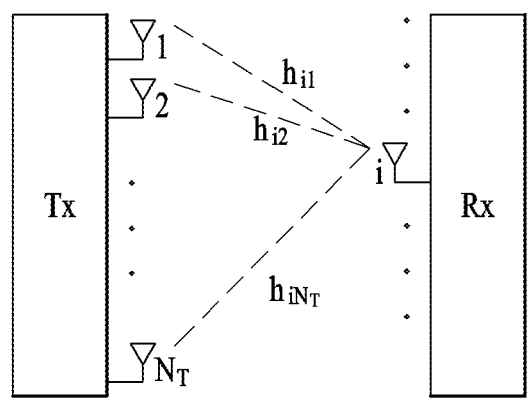
(b)

SIGNAL TRANSMISSION METHOD AND APPARATUS OF APPARATUS HAVING PLURALITY OF ANTENNAS IN WIRELESS COMMUNICATION SYSTEM

CROSS REFERENCE TO RELATED APPLICATIONS

This application is the National Phase of PCT International Application No. PCT/KR2015/012006, filed on Nov. 9, 2015, which claims priority under 35 U.S.C. 119(e) to U.S. Provisional Application No. 62/076,499, filed on Nov. 7, 2014, all of which are hereby expressly incorporated by reference into the present application.

TECHNICAL FIELD

Following description relates to a wireless communication system, more particularly, to a method for a device having a plurality of antennas to transmit a signal by applying CDD (cyclic delay diversity) based on a complex reference signal and an apparatus therefor.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

A technical task of the present invention is to perform DMRS-based CDD (cyclic delay diversity).

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by an apparatus having a plurality of antennas in a wireless communication system, includes the steps of mapping complex modulation symbols to L number of layers, sequentially applying a unit matrix U, a diagonal matrix D, and a precoding matrix W to the symbols mapped to the L number of layers, and mapping symbols mapped to DMRS ports by applying the W, the D, and the U to a resource and transmitting the symbols. In this case, the W may correspond to one of M number of precoder sets, each of the M number of precoder sets includes a plurality of column vectors, and if the number of the DMRS ports is less than M*L, the M number of precoder sets include at least one identical column vector.

To further achieve these and other advantages and in accordance with the purpose of the present invention, according to a different embodiment, an apparatus having a plurality of antennas in a wireless communication system includes a transmission apparatus and a processor, the processor configured to map complex modulation symbols to L number of layers, the processor configured to sequentially apply a unit matrix U, a diagonal matrix D, and a precoding matrix W to the symbols mapped to the L number of layers, the processor configured to map symbols mapped to DMRS ports by applying the W, the D, and the U to a resource and transmit the symbols. In this case, the W may correspond to one of M number of precoder sets, each of the M number of precoder sets include a plurality of column vectors, and if the number of the DMRS ports is less than M*L, the M number of precoder sets include at least one identical column vector.

The identical column vector can be positioned at a different column in the M number of precoder sets.

A different DMRS port can be mapped to the column vector.

A plurality of column vectors included in the M number of precoder sets can be orthogonal to each other.

The W can be changed in the M number of precoder sets according to a change of indexes of the symbols mapped to the L number of layers.

If the number of layers L is equal to or less than a predetermined value, the number of DMRS ports may correspond to M*L.

If the number of layers L is greater than a predetermined value, the number of DMRS ports can be regarded as being identical to the number of layers.

Advantageous Effects

According to the present invention, if legacy CDD is used in an evolved antenna system, it is able to prevent a CDD gain from being reduced.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

BEST MODE

Mode for Invention

Figure 1:
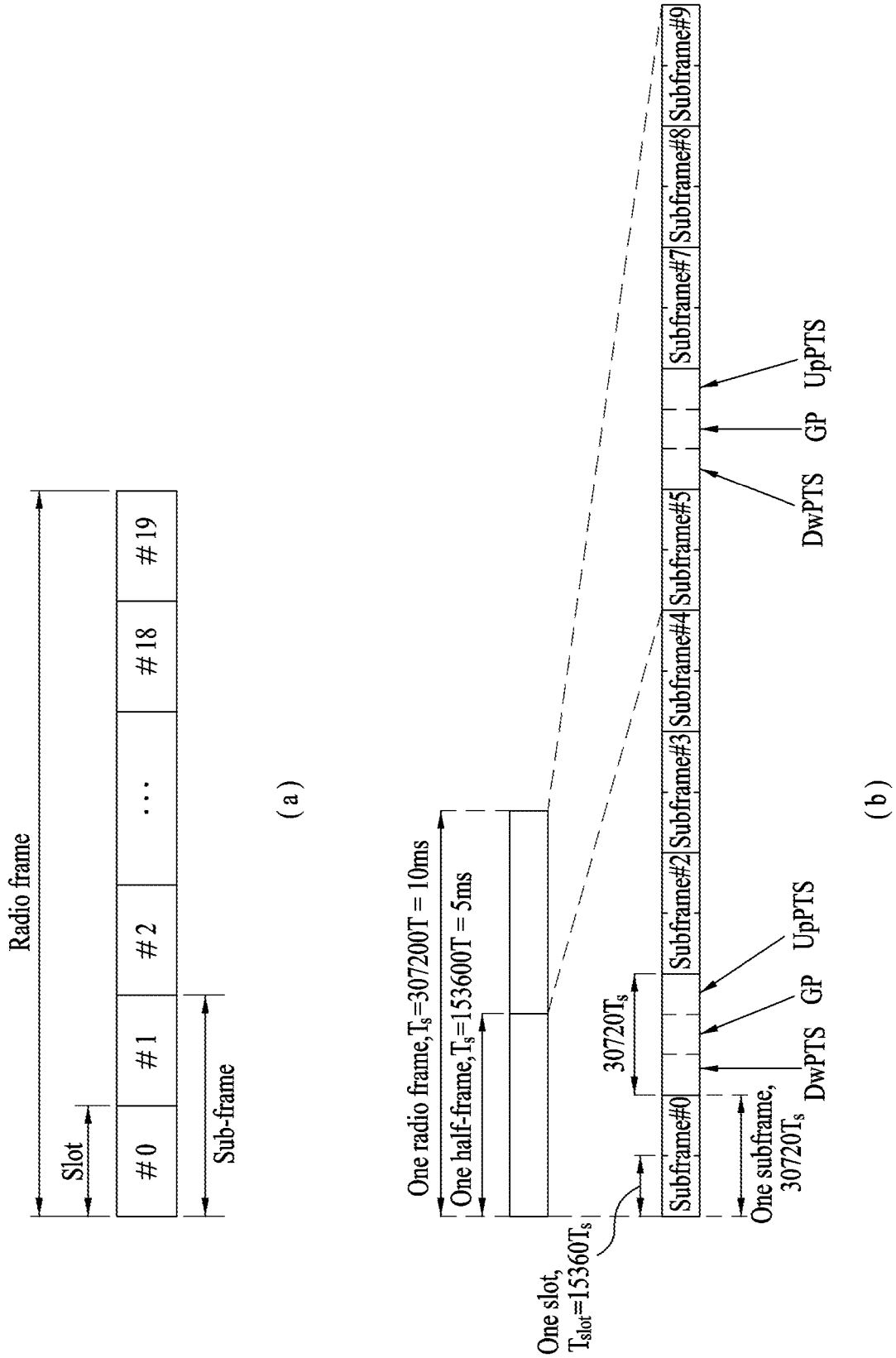
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

In the following description, the term "cell" may be interpreted as a transmission/reception point such as a base station (or eNB), a sector, a remote radio head (RRH), a relay, etc. In addition, it may be used as a comprehensive term referring to any object capable of identifying a component carrier (CC) at a specific transmission/reception point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISO.

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
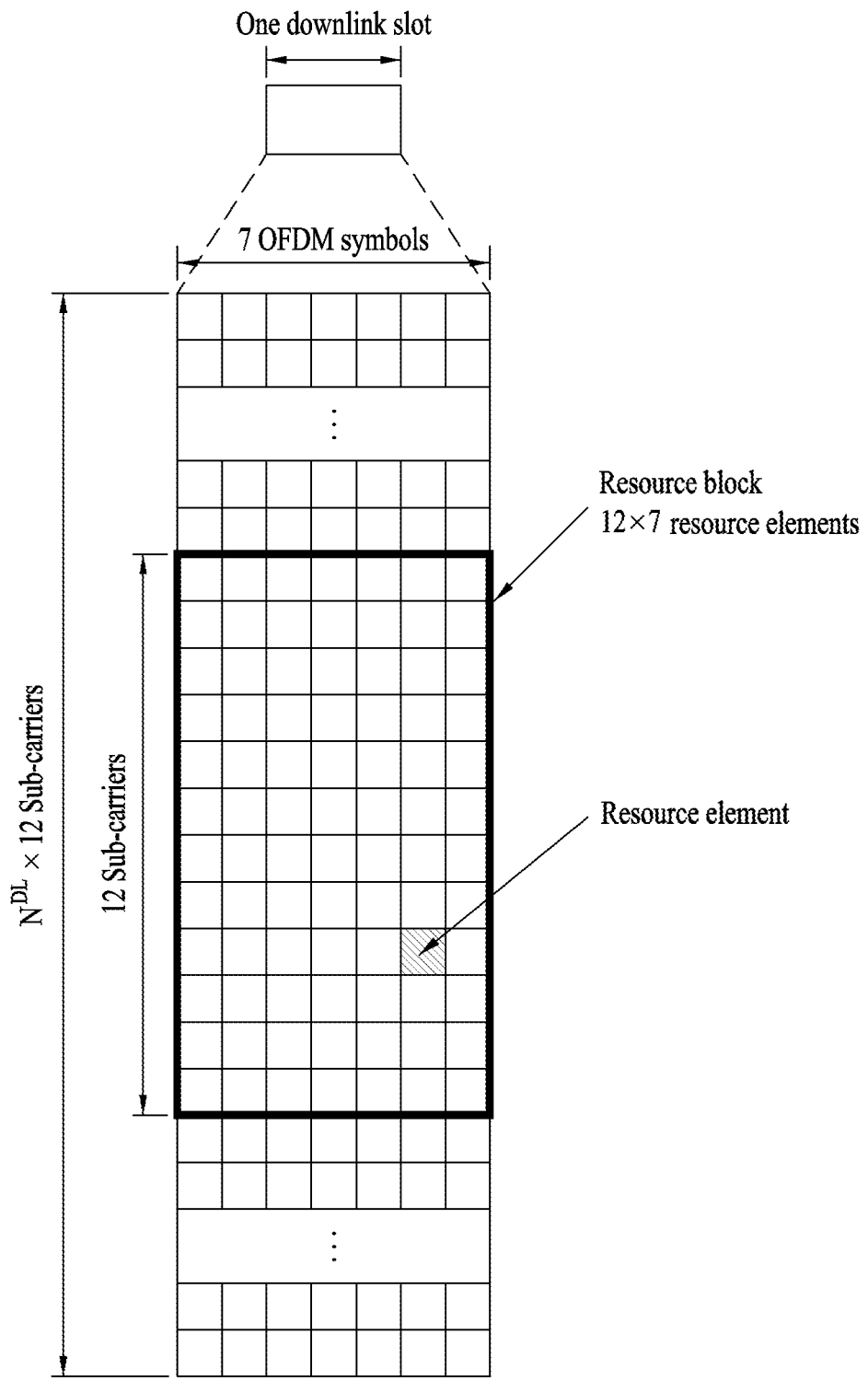
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
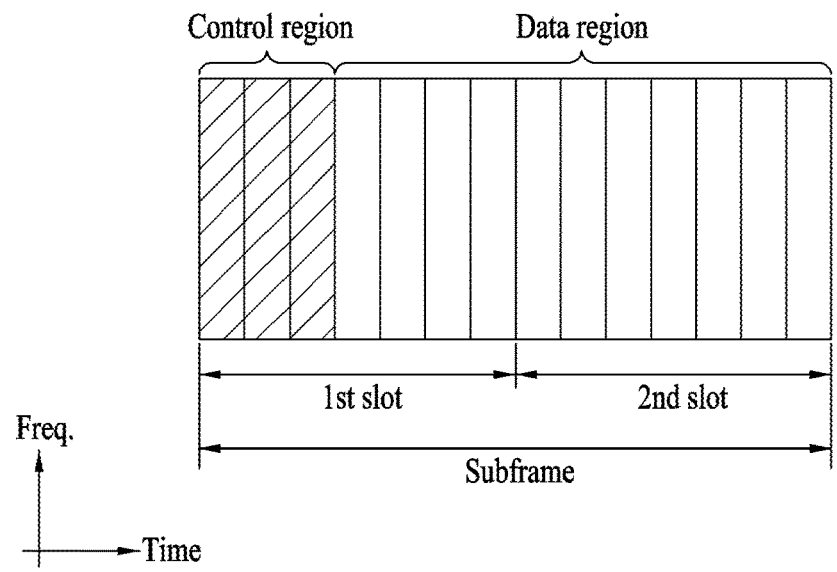
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDCCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. The CCE corresponds to a plurality of RE groups. The number of CCEs necessary for the PDCCH may be changed depending on a size, a coding rate and the like of the DCI. For instance, one of 1, 2, 4 and 8 CCEs (corresponding to PDCCH formats 0, 1, 2, and 3, respectively) can be used for PDCCH transmission. If a DCI size is large and/or if a low coding rate is required due to a poor channel state, a relatively large number of CCEs may be used to transmit a single PDCCH. A BS determines a PDCCH format in consideration of a size of DCI transmitted to a UE, a cell bandwidth, the number of downlink antenna ports, the amount of PHICH resources, etc. and adds CRC (cyclic redundancy check) to control information. The CRC is masked by an Identifier (ID) known as a radio network temporary identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is associated with system information (particularly, a system information block (SIB)), the CRC may be masked by a system information ID and a system information RNTI (SI-RNTI). To indicate that the PDCCH carries a random access response in response to a random access preamble transmitted by a UE, the CRC may be masked by a random access-RNTI (RA-RNTI).

Figure 4:
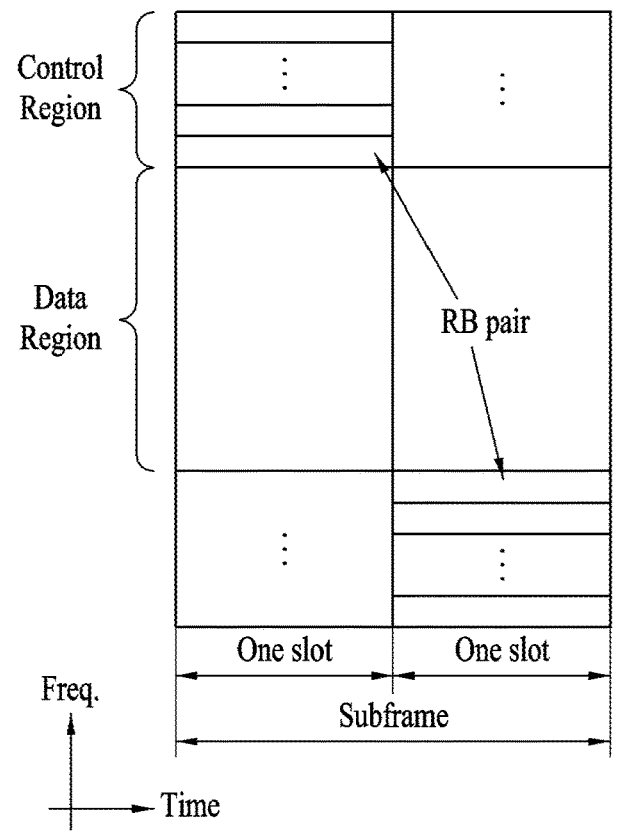
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared CHannel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary Reference Signal (RS)

Since a packet is transmitted on a radio channel in a wireless communication system, a signal may be distorted in the course of transmission. A receiving end needs to correct the distorted signal using channel information to receive a correct signal. To enable the receiving end to obtain the channel information, a transmitting end transmits a signal known to both a transmitting end and the receiving end. Thereafter, the receiving end can obtain the channel information based on the degree of distortion occurring when the signal is received on the radio channel. Such a signal is called a pilot signal or a reference signal.

When data is transmitted and received through multiple antennas, the receiving ends needs to be aware of a channel state between each transmit antenna and each receive antenna to receive the data correctively. Accordingly, a separate reference signal needs to exist for each transmitting antenna, more particularly, for each antenna port.

A reference signal may be divided into an uplink reference signal and a downlink reference signal. According to the current LTE system, the uplink reference signal may include:

i) a demodulation reference signal (DM-RS) for channel estimation to coherently demodulate information transmitted through a PUSCH and a PUCCH; and ii) a sounding reference signal (SRS) for enabling a BS to measure an uplink channel quality of a frequency band at a different network.

On the other hand, the downlink reference signal may include:

i) a cell-specific reference signal (CRS) shared by all UEs within a cell;

ii) a UE-specific reference signal configured for only a specific UE;

iii) a demodulation reference signal (DM-RS) transmitted for coherent demodulation when a PDSCH is transmitted;

iv) a channel state information-reference signal (CSI-RS) for transmitting channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate a geographic position information of a UE.

Reference signals are mainly classified into two types according to the purposes thereof: a reference signal for channel information acquisition and a reference signal for data demodulation. Since the former reference signal is used to allow a UE to acquire downlink channel information, it should be transmitted over a wideband. In addition, even a UE which does not receive downlink data in a specific subframe should receive the corresponding reference signal. In addition, this reference signal can also be used in case of handover. The latter reference signal is transmitted through resources used when a BS transmits downlink data. By receiving this reference signal, a UE may perform a channel measurement and then demodulate data. Such a reference signal should be transmitted in a region in which data is transmitted.

Modeling of Multi-Antenna (MIMO) System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna so far, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the present specification, a 'rank' for MIMO transmission corresponds to the number of paths capable of independently transmitting a signal at specific timing and a specific frequency resource and 'number of layers' corresponds to the number of signal streams transmitted via each path. In general, since a transmitting end transmits the number of layers corresponding to the number of ranks used for transmitting a signal, the rank and the number of layers have the same meaning unless there is a special comment.

Sounding Reference Signal (SRS)

A UE can transmit an SRS on an SRS resource for uplink channel estimation of an eNB. The SRS can be transmitted by two trigger types including a trigger type 0 indicating an SRS resource by higher layer signaling and a trigger type 1 indicating an SRS resource by a DCI format. If it is necessary to perform the SRS transmission transmitted by the trigger type 0 and the SRS transmission transmitted by the trigger type 1 in an identical subframe, the UE preferentially performs the SRS transmission transmitted by the trigger type 1.

An SRS parameter for the trigger type 0 and the trigger type 1 can be configured to a UE for each serving cell. The SRS parameter can include $\hat{k}_{start}$, start physical resource block allocation $n_{RRC}$, duration indicating a section, an SRS subframe offset $T_{offset}$, SRS period $T_{SRS}$, $srs$-$ConfigIndex$ $I_{SRS}$ for $T_{SRS}$, SRS bandwidth $B_{SRS}$, frequency hopping bandwidth $b_{hop}$, cyclic shift $n_{SRS}^{cs}$, antenna port number $N_p$, and the like. For details, it may refer to legacy LTE standard document.

When the SRS is transmitted by the trigger type 1, a DCI format 4 can include SRS request values shown in Table 1 in the following and an SRS parameter set can be determined according to each SRS request value.

TABLE 1

| Value of SRS request field | Description |
|---|---|
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

When the SRS is transmitted by the trigger type 1, a DCI format 0 uses a single parameter set configured by higher layer signaling. DCI format 1A/2B/2C/2D uses a common SRS parameter configured by higher layer signaling.

In the trigger type 0, in case of TDD or FDD where $T_{SRS} > 2$, an SRS is transmitted in a subframe that satisfies Equation 12 in the following.

$$(10 \cdot n_f k_{SRS} - T_{offset}) \bmod T_{SRS} = 0 \quad \text{[Equation 12]}$$

In this case, $T_{offset}$ and $T_{SRS}$ may follow Table 2 in case of FDD and follow Table 3 in case of TDD. $k_{SRS}$ may follow Table 4 in the following.

TABLE 2

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

TABLE 4

| | subframe index n | | | | | | | | |
|---|---|---|---|---|---|---|---|---|---|
| | 1 | | | | | 6 | | | |
| | 1st symbol of UpPTS | 2nd symbol of UpPTS | 2 | 3 | 4 | 5 | 1st symbol of UpPTS | 2nd symbol of UpPTS | 7 8 9 |
| $k_{SRS}$ in case UpPTS length of 2 symbols | 0 | 1 | 2 | 3 | 4 | | 5 | 6 | 7 8 9 |
| $k_{SRS}$ in case UpPTS length of 1 symbol | 1 | | 2 | 3 | 4 | | 6 | | 7 8 9 |

In case of the trigger type 1, if a UE receives an SRS request in a subframe n, the UE can transmit an SRS in a first subframe that satisfies n+k, k≥4 and Equation 13 in the following.

$(10 \cdot n_f + k_{SRS} - T_{offset,1}) \mod T_{SRS,1} = 0$, TDD with $T_{SRS,1} > 2$ and FDD $(k_{SRS} - T_{offset,1}) \mod 5 = 0$, TDD with $T_{SRS,1} = 2$ [Equation 13]

In Equation 13, each parameter may follow Table 5 in case of FDD and follow Table 6 in case of TDD.

TABLE 5

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 6

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |

TABLE 6-continued

| SRS Configuration Index $I_{SRS}$ | SRS Periodicity $T_{SRS,1}$ (ms) | SRS Subframe Offset $T_{offset,1}$ |
|---|---|---|
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Evolved Antenna System

A wireless communication system appearing after LTE Rel-12 considers introducing an active antenna system (hereinafter, AAS). Unlike an active circuit capable of adjusting a phase and a size of a signal and a legacy passive antenna system that antennas are separated from each other, the AAS corresponds to a system that each antenna is configured as an active antenna including an active circuit. Since the AAS uses an active antenna, it is not necessary for the AAS to have a separate cable for connecting an active circuit with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

Figure 6:
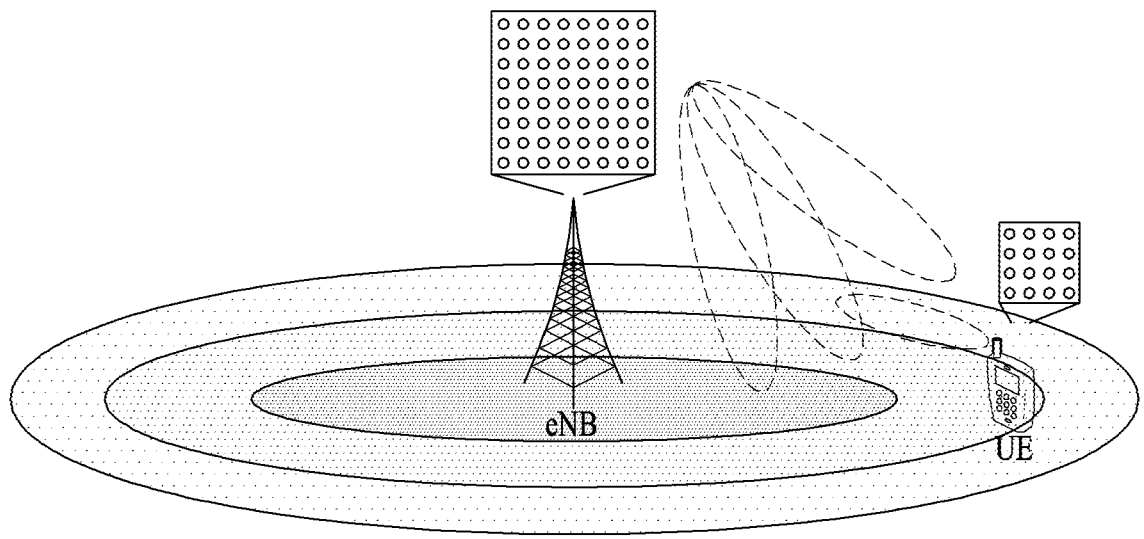
FIG. 6 is a diagram for explaining an evolved antenna system.

As the evolved antenna system such as the AAS and the like is introduced, a massive MIMO structure including a plurality of input/output antennas and multi-dimensional antenna structure is also considered. As an example, in case of forming a 2D antenna array instead of a legacy straight antenna array, it may be able to form a 3D beam pattern according to the active antenna of the AAS. In the aspect of an eNB, if the 3D beam pattern is utilized, the eNB may consider forming a sector not only in horizontal direction but also in a vertical direction of a beam. Moreover, in the aspect of a UE, when a reception beam is formed by utilizing a massive reception antenna, the UE may expect a signal power increasing effect according to an antenna array gain. Hence, it may have an advantage that performance requirement of a system is satisfied by transmit power lower than legacy transmit power. FIG. 6 shows an example of the aforementioned antenna system.

In the following, when a DMRS-based CDD (cyclic delay diversity) is applied according to various embodiments of the present invention, a method of mapping between a DMRS antenna port (AP) and an RE is explained.

Figure 7:
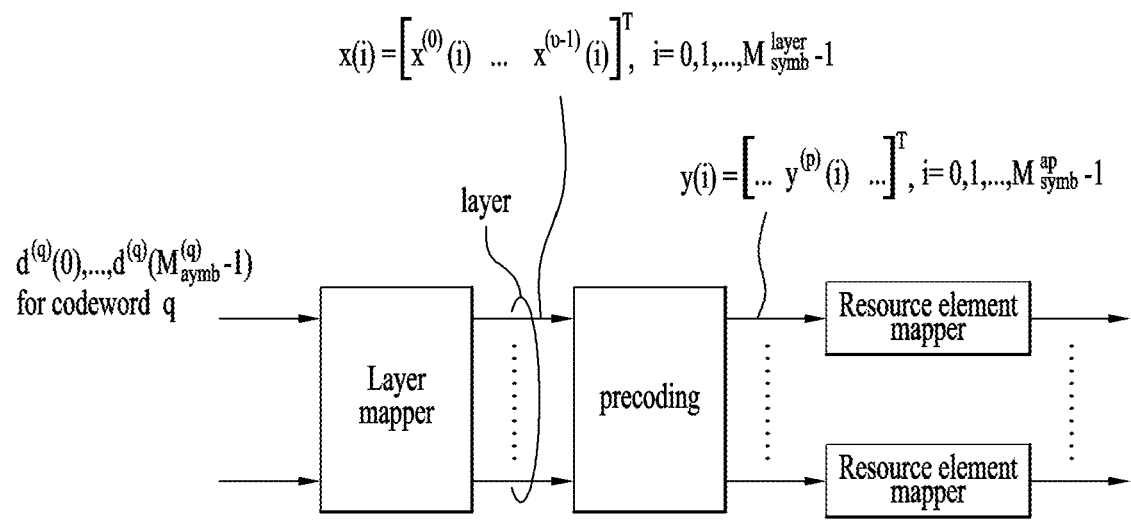
FIGS. 7 and 8 are diagrams for explaining embodiments of the present invention.

According to a DL/UL signal transmission method of an eNB or a UE in accordance with one embodiment of the present invention, complex-values modulation symbols (e.g., $d^{(q)}(0), \ldots, d^{(q)}(M_{symb}^{(q)}-1)$ in FIG. 7) can be mapped to L number of layers. In this case, a unit matrix U, a diagonal matrix D, and a precoding matrix W can be sequentially applied to symbols $(x(i)=[x^{(0)}(i) \ldots x^{(v-1)}(i)]^T$. i=0, 1, ..., $M_{symb}^{layer}-1$) which are mapped to the L number of layers. This can be represented as equation 14 in the following.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$ [Equation 14]

In equation 14, i=0, 1, . . . , $M_{symb}^{ap}-1$, $M_{symb}^{ap}=M_{symb}^{layer}$ corresponds to the number of symbols per layer and $y^{(p)}(i)$ corresponds to a signal for an antenna/DMRS port p. It is able to transmit symbols mapped to DMRS ports by applying the W, D, and U.

In this case, the W corresponds to one of M number of precoder sets and each of the M number of precoder sets (e.g., W(1), W(2)) can include a plurality of column vectors. For example, if precoder sets (M=2) correspond to 2*2 matrix, each of the precoder sets may satisfy W(1)=[w1, w2] and W(2)=[w3, w4]. In this case, w1, w2, w3, and w4 may correspond to column vectors.

DMRS port number X may correspond to M*L. If the DMRS port number is smaller than M*L, the M number of precoder sets can include at least one identical column vector (w1). A different DMRS port can be mapped to the column vector. In other word, a DMRS port can be mapped to each of precoders belonging to a precoder set. A part of DMRS ports can be shared within a precoder set. For example, assume a case that L=2, M=2, and the number of DMRS ports corresponds to 3. In this case, w1 can be shared between two precoder sets such as W(1)=[w1,w2] and W(2)=[w3,w1]. The identical column vector can be located at a different column in the M number of precoder sets. In particular, when a specific DMRS port is shared between precoders, the DMRS port uses a different layer between the precoders. This is intended to prevent a specific layer signal from continuously using the same beam to obtain a maximum diversity gain. A plurality of column vectors included in the M number of precoder sets can be orthogonal to each other. And, the W can be changed in the M number of precoder sets according to the change of indexes of symbols mapped to the L number of layers. In particular, a precoder set can be changed according to i in the M number of precoder sets.

As mentioned in the foregoing description, if a DMRS port is shared, it may be able to enhance overall performance. If the number of DMRS ports is increased, since RS overhead increases, it is able to obtain a diversity gain. However, since a codeword length is reduced, a gain can be lost or overall performance can be deteriorated compared to a case of not using CDD.

DMRS port mapping according to a precoder used in CDD can be comprehended as DMRS port mapping according to an RE or an RE group. This is because if CDD is applied and precoder cycling is applied according to an RE, an RE using a corresponding precoder performs channel estimation using a specific DMRS.

An eNB can signal DMRS port mapping according to a precoder (or RE) used in the CDD to a UE via physical layer signaling or higher layer signaling. Or, If L is equal to or less than a specific value, assume that the number of DMRS ports is always configured by M*L. If the L is greater than the specific value, the number of DMRS ports is fixed by L. In this case, it may be able to determine a rule that DMRS port according to an RE uses all ports. In particular, if the number of layers L is equal to or less than a predetermined value, the number of DMRS ports corresponds to M*L. If the number of layers L is greater than the predetermined value, the number of DMRS ports can be regarded as being identical to the number of layers. For example, if the L is less than 8, M*L number of DMRS ports are configured. If the L is equal to or greater than 8, it may be able to configure precoder cycling per RE not to be applied.

In the foregoing description, the D and U may use matrixes illustrated in Table 7 in the following. Yet, if the D and U respectively correspond to a unit matrix and a diagonal matrix, it may use a matrix rather than the matrixes illustrated in Table 7.

TABLE 7

| Number of layers $v$ | $U$ | $D(i)$ |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The W may use matrixes illustrated in Table 8 in the following or a matrix determined by equation 15 in the following. The present invention is not limited by the examples.

TABLE 8

| Codebook index | Number of layers $v$ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

$$W_n = I - 2u_n u_n^H / u_n^H u_n \quad \text{[Equation 15]}$$

In Equation 15, I corresponds to 4*4 identity matrix and $u_n$ can be determined by Table 9 in the following.

TABLE 9

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{1324\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Subsequently, if the number of TXRUs of an eNB corresponds to N and CDD is performed by cycling M number of precoder sets in L layer transmission, it may be able to signal an M value using one of methods described in the following.

i) A precoder set size (M) is signaled to a UE via physical layer or higher layer signaling. In this case, it is necessary to configure M*L number of DMRS antenna ports. As a different method, it may be able to explicitly signal the number of DMRS ports without signaling the M. In this case, it may assume that the number of transmitted layers (L) is identical to RI fed back by a UE. Or, it may separately signal an L value (e.g., DCI).

ii) The M value can be determined in advance according to a layer size (L). In other word, in case of using DMRS-based CDD, the number of DMRS ports in use is determined in advance according to the L. If a UE is configured by a transmission mode, the UE performs decoding by predicting the number of DMRS ports in use according to the L. For example, the M can be determined in advance according to the L in a manner that the M corresponds to 4 when the L corresponds to 2, the M corresponds to 2 when the L corresponds to 4, and the M corresponds to 1 when the L corresponds to 8. This value can be differently configured according to N. For example, a combination between the L and the M can be differently configured in a BS where the N corresponds to 16 and a BS where the N corresponds to 64.

iii) The M value can be fixed by a specific value in advance. For example, the M value can be fixed by 2. In this case, a BS can reduce additional signaling overhead by signaling the number of DMRS ports or the number of layers. In case of signaling the number (X) of DMRS ports, it may be able to implicitly configure the number (L) of layers by dividing the X by the predetermined value M (e.g., L=X/M).

In the following, a method of mapping precoders according to an RE is explained in accordance with various embodiments of the present invention.

Figure 8:
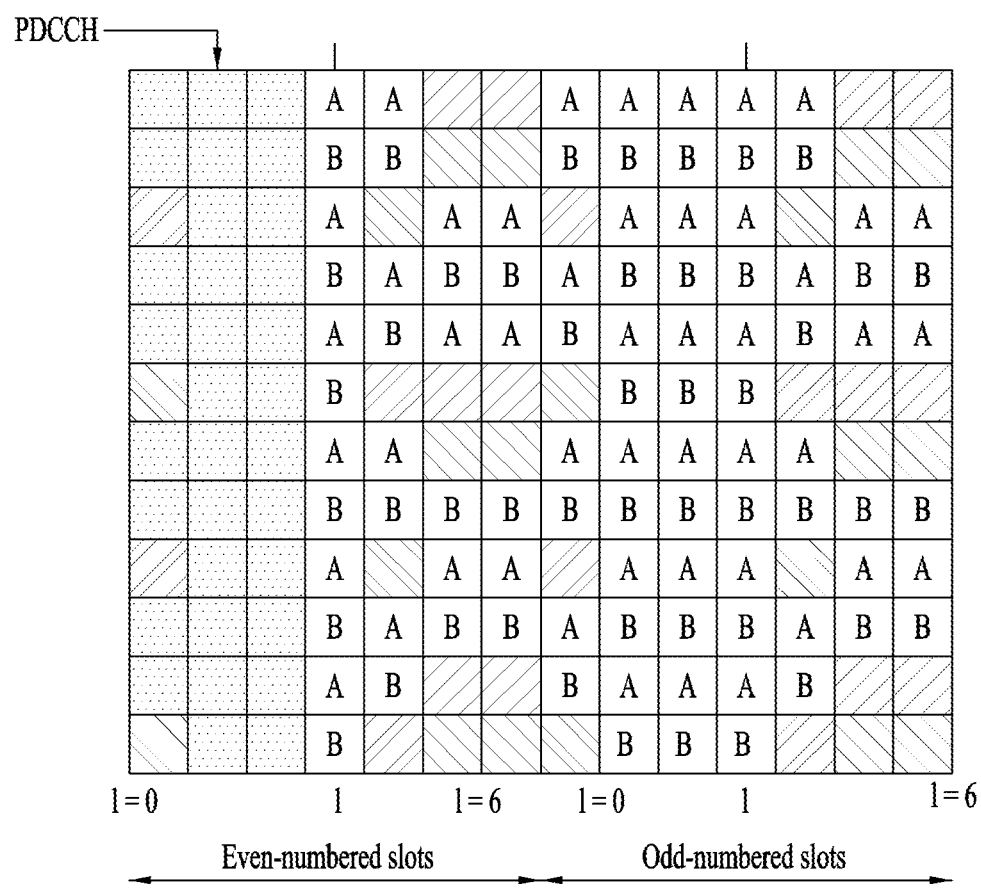

First of all, it may be able to alternately map precoders to PDSCH using a frequency first scheme according to a precoder cycling set size (M) except a previously transmitted main signal or a channel. In particular, it may be able to map an RE in consideration of (determining whether to empty an RE) an RS (e.g., CRS, CSI-RS, zero-power CSI-RS, and DMRS) transmitted to a PDSCH region. FIG. 8 shows an embodiment that a precoder is mapped to an RE when M corresponds to 2. Referring to FIG. 8, precoders are alternately mapped by emptying (avoiding) a position of a CRS and/or a CSI-RS and/or a PSS/SSS.

Secondly, it may be able to map an RE without considering an RS (a CRS and/or a CSI-RS and/or a PSS/SSS) transmitted to a PDSCH region. In this case, an RE is mapped without considering a CSI-RS or other RS (zero-power CSI-RS). In other word, it may be able to map an RE in consideration of a CRS and a DMRS only. Then, a corresponding position is not used according to a practically transmitted RS pattern. According to the present method, the number of REs per precoder may vary CSI-RS configuration/CRS/zero-power CSI-RS pattern.

Thirdly, it may be able to perform precoder cycling according to an OFDM symbol or an OFDM symbol group (e.g., slot or subframe). For example, if vertical tilting is performed by an analog scheme rather than a digital scheme, the tilting can be applied in a unit of an OFDM symbol or an OFDM symbol group. In this case, precoder mapping per RE may vary in a symbol unit/symbol group unit. In this case, since analog tilting is also applied to a DMRS, it is necessary for a DMRS port and an OFDM symbol/symbol group to assume the same tilting.

Fourthly, it may consider a method of dividing precoder cycling by an OFDM symbol or an OFDM symbol group on the basis of a symbol in which a DMRS is transmitted. For example, if a DMRS is transmitted in every symbol, it may be able to apply different precoder cycling to each symbol. If a DMRS is transmitted to a specific symbol, precoder cycling can be applied in a slot unit. According to the present method, since a UE is able to know whether or not a precoder is changed only when a DMRS and data are transmitted by the same precoder, whether or not the precoder is changed can be determined on the basis of the DMRS. The present method is not restricted to a legacy LTE DMRS port configuration only. When a DMRS is transmitted according to a symbol or a symbol group in a different communication system rather than LTE, precoder cycling can be applied in a unit of an OFDM symbol group adjacent to a symbol in which the DMRS is transmitted.

Meanwhile, when the proposed DMRS-based CDD is applied, it may be able to use one of two methods described in the following for a PRG (precoding resource block groups) configuration.

Since the CDD corresponds to a method for obtaining diversity, the PRG can be disabled. Separate channel estimation is assumed for each PRB and channel estimation is performed in an RB unit all the time.

Or, a PRG used in legacy LTE can be applied as it is. In case of the DMRS-based CDD, it may be able to configure DMRS ports greater than the number of layers. In this case, it may be able to continuously perform channel estimation in a PRG unit on the same port in each RB.

In summary, one embodiment of the present invention considers the aforementioned DMRS-based CDD. In particular, W uses a precoder applied to a DMRS. In this case, the precoder is configured based on PMI or an SRS fed back by a UE to apply the CDD. In case of the DMRS-based CDD, the W is changed according to each RE to obtain a diversity gain. If the DMRS-based CDD is used, it may be able to prevent a CDD gain from being reduced in AAS system. Specifically, if a CRS is transmitted via a specific physical antenna port or a fixed precoding matrix in the AAS system, an SNR difference between the DMRS and the CRS may increase. In this case, if CRS-based CDD is applied to the AAS system, channel estimation capability of the CRS is deteriorated and a gain of the CDD can be disappeared.

Configurations of Devices for Embodiments of the Present Invention

Figure 9:
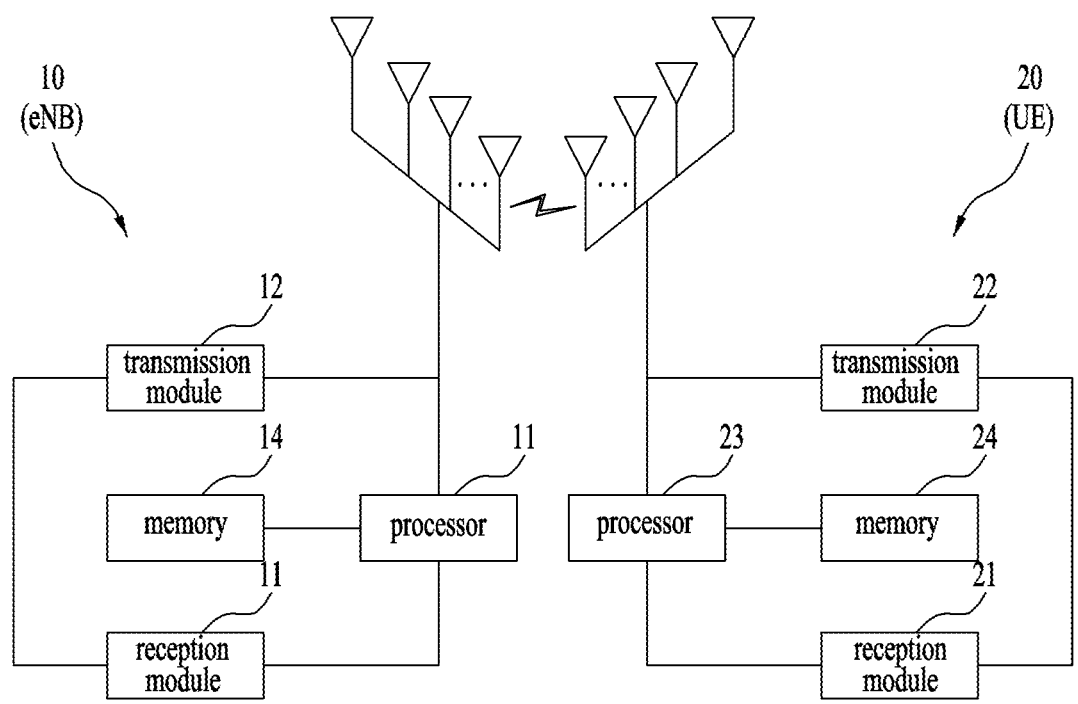
FIG. 9 is a diagram for configurations of a transmitter and a receiver.

FIG. 9 is a diagram illustrating configuration of a transmit point apparatus and a UE according to one embodiment of the present invention.

Referring to FIG. 9, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 9, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 9 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a signal, by an apparatus having a plurality of antennas in a wireless communication system, the method comprising:
    mapping complex modulation symbols to L number of layers;
    sequentially applying a cyclic delay diversity related diagonal matrix D, and a precoding matrix W to the complex modulation symbols mapped to the L number of layers; and
    mapping symbols mapped to a plurality of demodulation reference signal (DMRS) ports by applying the W and the D to a resource and transmitting the symbols,
    wherein the W corresponds to one of M number of precoder sets,
    wherein the plurality of DMRS ports are configured to a number of DMRS ports corresponding to the M*L when the L is less than or equal to a predetermined number,
    wherein the plurality of DMRS ports are configured to a number of DMRS ports corresponding to the L when the L is greater than the predetermined number,
    wherein the M is configured to be any one of 2 and 4, and
    wherein the predetermined number is configured to be any one of 2, 4, and 8.

2. The method of claim 1, wherein each of the M number of precoder sets comprises a plurality of column vectors,
    wherein when the number of the plurality of DMRS ports is less than the M*L, the M number of precoder sets comprise at least one identical column vector, and
    wherein the identical column vector is positioned at a different column in the M number of precoder sets.

3. The method of claim 2, wherein the plurality of DMRS ports are mapped to each of the M number of precoder sets.

4. The method of claim 2, wherein the plurality of column vectors contained in the M number of precoder sets are orthogonal to each other.

5. The method of claim 1, wherein the W is changed in the M number of precoder sets according to a change of indexes of the symbols mapped to the L number of layers.

6. An apparatus having a plurality of antennas in a wireless communication system, the apparatus comprising:
    a transmission apparatus; and
    a processor configured to:
    map complex modulation symbols to L number of layers, sequentially apply a cyclic delay diversity related diagonal matrix D, and a precoding matrix W to the complex modulation symbols mapped to the L number of layers, and
    map symbols mapped to a plurality of demodulation reference signal (DMRS) ports by applying the W and the D to a resource and transmit the symbols,
    wherein the W corresponds to one of M number of precoder sets,
    wherein the plurality of DMRS ports are configured to a number of DMRS ports corresponding to the M*L when the L is less than or equal to a predetermined number,
    wherein the plurality of DMRS ports are configured to a number of DMRS ports corresponding to the L when the L is greater than the predetermined number,
    wherein the M is configured to be any one of 2 and 4, and
    wherein the predetermined number is configured to be any one of 2, 4, and 8.

7. The apparatus of claim 6, wherein each of the M number of precoder sets comprises a plurality of column vectors,
    wherein when the number of the plurality of DMRS ports is less than the M*L, the M number of precoder sets comprise at least one identical column vector, and
    wherein the identical column vector is positioned at a different column in the M number of precoder sets.

8. The apparatus of claim 7, wherein the plurality of DMRS ports are mapped to each of the M number of precoder sets.

9. The apparatus of claim 7, wherein the plurality of column vectors contained in the M number of precoder sets are orthogonal to each other.

10. The apparatus of claim 6, wherein the W is changed in the M number of precoder sets according to a change of indexes of the symbols mapped to the L number of layers.

* * * * *